US012145289B2

(12) United States Patent
Lu

(10) Patent No.: US 12,145,289 B2
(45) Date of Patent: Nov. 19, 2024

(54) CHAIN SAW

(71) Applicant: Nanjing Chervon Industry Co., Ltd., Nanjing (CN)

(72) Inventor: Yang Lu, Nanjing (CN)

(73) Assignee: Nanjing Chervon Industry Co., Ltd. (CN)

( * ) Notice: Subject to any disclaimer, the term of this patent is extended or adjusted under 35 U.S.C. 154(b) by 583 days.

(21) Appl. No.: 17/374,175

(22) Filed: Jul. 13, 2021

(65) Prior Publication Data

US 2021/0339421 A1 Nov. 4, 2021

Related U.S. Application Data

(63) Continuation-in-part of application No. 16/407,790, filed on May 9, 2019, now abandoned.

(30) Foreign Application Priority Data

Jun. 5, 2018 (CN) ......................... 201810566351.7

(51) Int. Cl.

*B27B 17/14* (2006.01)
*B27B 17/02* (2006.01)
*B27B 17/10* (2006.01)

(52) U.S. Cl.

CPC .............. *B27B 17/14* (2013.01); *B27B 17/02* (2013.01); *B27B 17/10* (2013.01)

(58) Field of Classification Search

CPC .......... B27B 17/02; B27B 17/14; B27B 17/10
USPC .................................................... 30/381–387
See application file for complete search history.

(56) References Cited

U.S. PATENT DOCUMENTS

| | | | | |
|---|---|---|---|---|
| 3,636,995 | A | 1/1972 | Newman | |
| 5,491,899 | A | 2/1996 | Schliemann | |
| 6,532,671 | B1 | 3/2003 | Jong | |
| 6,560,879 | B2 | 5/2003 | Franke et al. | |
| 6,564,459 | B1 | 5/2003 | Steinbrueck et al. | |
| 6,782,627 | B2 | 8/2004 | Hermes et al. | |
| 6,877,233 | B1 | 4/2005 | Franke | |
| 7,107,689 | B2 | 9/2006 | Keeton et al. | |
| 7,350,301 | B2 | 4/2008 | Chung Lee | |
| 7,434,502 | B2 | 10/2008 | Keeton et al. | |
| 7,600,323 | B2 | 10/2009 | Sugishita | |
| 7,676,934 | B2 | 3/2010 | Liao | |
| 8,434,236 | B2 * | 5/2013 | Pellenc | B27B 17/14 30/381 |
| 8,595,943 | B2 | 12/2013 | Buttery et al. | |

(Continued)

FOREIGN PATENT DOCUMENTS

| | | | | |
|---|---|---|---|---|
| CN | 101758520 A | | 6/2010 | |
| GB | 2354481 A | * | 3/2001 | B27B 17/14 |

*Primary Examiner* — Jason Daniel Prone
(74) *Attorney, Agent, or Firm* — Greenberg Traurig, LLP

(57) ABSTRACT

A chain saw includes a chain, a guide plate, and a locking device for tensioning the chain. The locking device includes an operating member rotatable about a first axis, a driving member for driving the guide plate to move to tension the chain, a first clutch coupling with the operating member, and a second clutch including meshing teeth cooperating with the first clutch. The driving member is connected with the second clutch, each of the meshing teeth includes a first sloped surface having a first slop and a second sloped surface having a second slop, the absolute value of the first slope is greater than that of the second slope.

20 Claims, 14 Drawing Sheets

(56) References Cited

U.S. PATENT DOCUMENTS

| | | | | |
|---|---|---|---|---|
| 8,869,787 | B2 * | 10/2014 | Tholking | B27B 17/02 30/382 |
| 9,138,912 | B2 | 9/2015 | Kapinsky et al. | |
| 9,676,115 | B2 * | 6/2017 | Takayanagi | B27B 17/14 |
| 9,713,881 | B2 * | 7/2017 | Zimmermann | B27B 17/14 |
| 9,718,208 | B2 * | 8/2017 | Takayanagi | B27B 17/14 |
| 9,878,463 | B2 * | 1/2018 | Yu | B27B 17/14 |
| 10,328,599 | B2 * | 6/2019 | Sorell | B27B 17/02 |
| 10,882,206 | B2 * | 1/2021 | McRoberts | B27B 17/14 |
| 11,413,782 | B2 * | 8/2022 | Zhang | B27B 17/02 |
| 11,679,525 | B2 * | 6/2023 | McRoberts | B27B 17/14 30/385 |
| 11,772,295 | B2 * | 10/2023 | Bathke | B27B 17/14 30/383 |
| 2009/0007439 | A1 | 1/2009 | Sugishita | |
| 2009/0241353 | A1 | 10/2009 | Ericson et al. | |
| 2013/0086810 | A1 | 4/2013 | Peterson | |
| 2014/0106915 | A1 * | 4/2014 | Kistler | B27B 17/14 474/111 |
| 2014/0250702 | A1 | 9/2014 | Zimmermann et al. | |
| 2014/0283395 | A1 | 9/2014 | Fu et al. | |
| 2015/0135542 | A1 | 5/2015 | Cook | |
| 2016/0039110 | A1 | 2/2016 | Schiedt et al. | |
| 2019/0366580 | A1 * | 12/2019 | Lu | B27B 17/14 |

* cited by examiner

CHAIN SAW

CROSS REFERENCE TO RELATED APPLICATION

The present application is a continuation in part of U.S. application Ser. No. 16/407,790, filed May 9, 2019, which claims the benefit under 35 U.S.C. § 119(a) of Chinese Patent Application No. CN 201810566351.7, filed on Jun. 5, 2018, each of which are incorporated herein by reference in their entirety.

FIELD OF THE DISCLOSURE

The present description relates generally to power tools and more particularly a chain saw.

BACKGROUND OF RELATED ART

As a power tool, a chain saw includes a chain with a plurality of cutting portions for performing a cutting function. After a long period of work, the chain may become slack, which may affect the cutting performance. The existing chain tensioning devices are complicated in structure and are inconvenient to operate.

SUMMARY

A chain saw is described which includes a chain, a guide plate for supporting and guiding the chain, a main body comprising a power output unit configured for driving the chain to cut a workpiece, and a locking device configured for fixing the guide plate and tensioning the chain. An example locking device comprises a device housing, an operating member configured to be operated by a user to rotate about a first axis, a first locking member configured for locking or releasing the guide plate, and a first clutch assembly comprising a first clutch and a second clutch. The first clutch assembly has a first state and a second state, the first clutch is operative to transmit a rotation of the operating member to the second clutch when the first clutch assembly is in the first state, the first clutch is operative to stop transmitting the rotation to the second clutch and the first clutch assembly is operative to produce a relative displacement relative to the second clutch when the first clutch assembly is in the second state.

DETAILED DESCRIPTION

Figure 1:
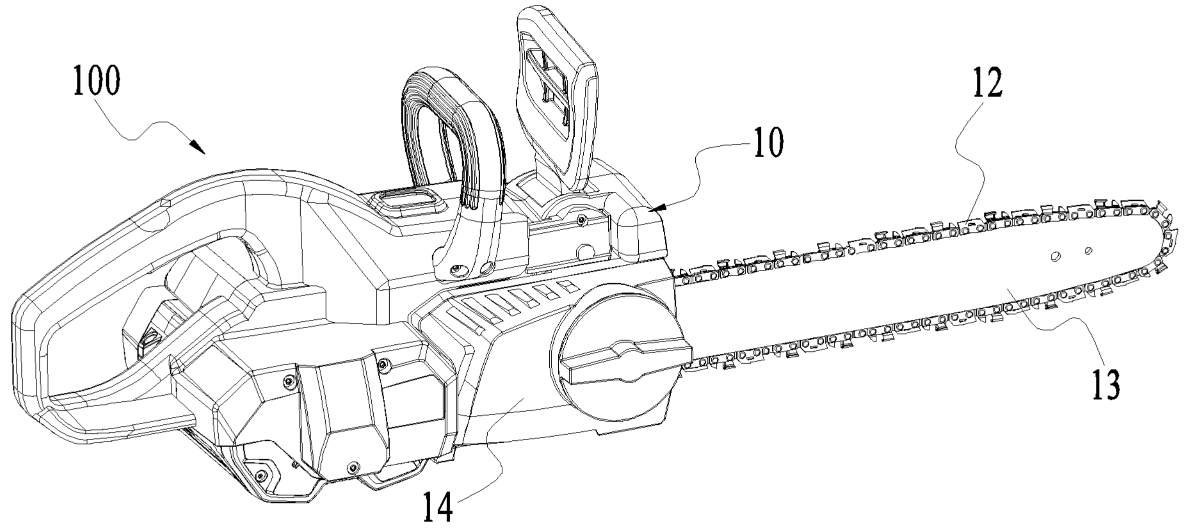
FIG. 1 is a perspective schematic view illustrating a chain saw in a first example.
Figure 2:
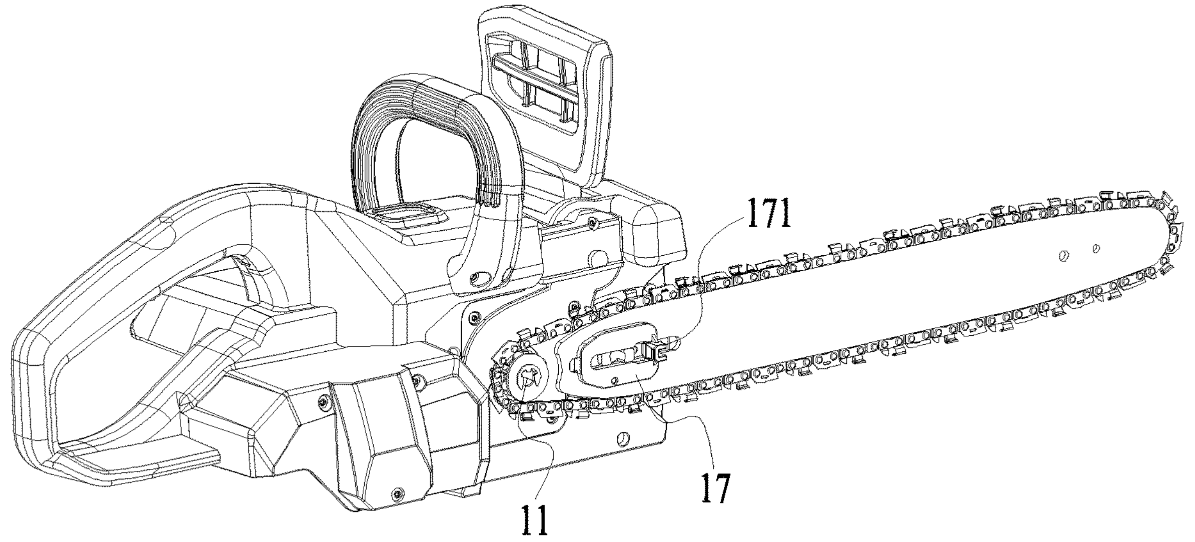
FIG. 2 is a schematic view illustrating the chain saw of FIG. 1 with a locking device removed.
Figure 3:
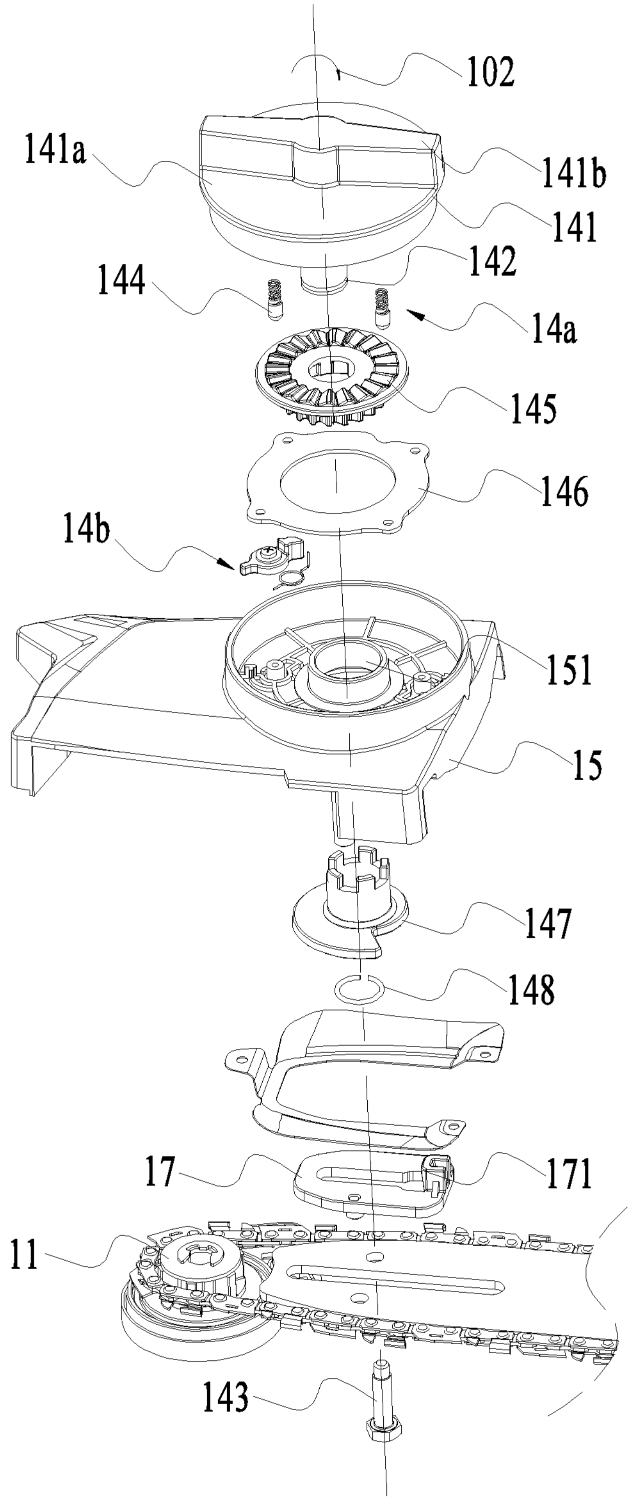
FIG. 3 is an exploded schematic view of the locking device of the chain saw of FIG. 1.
Figure 4:
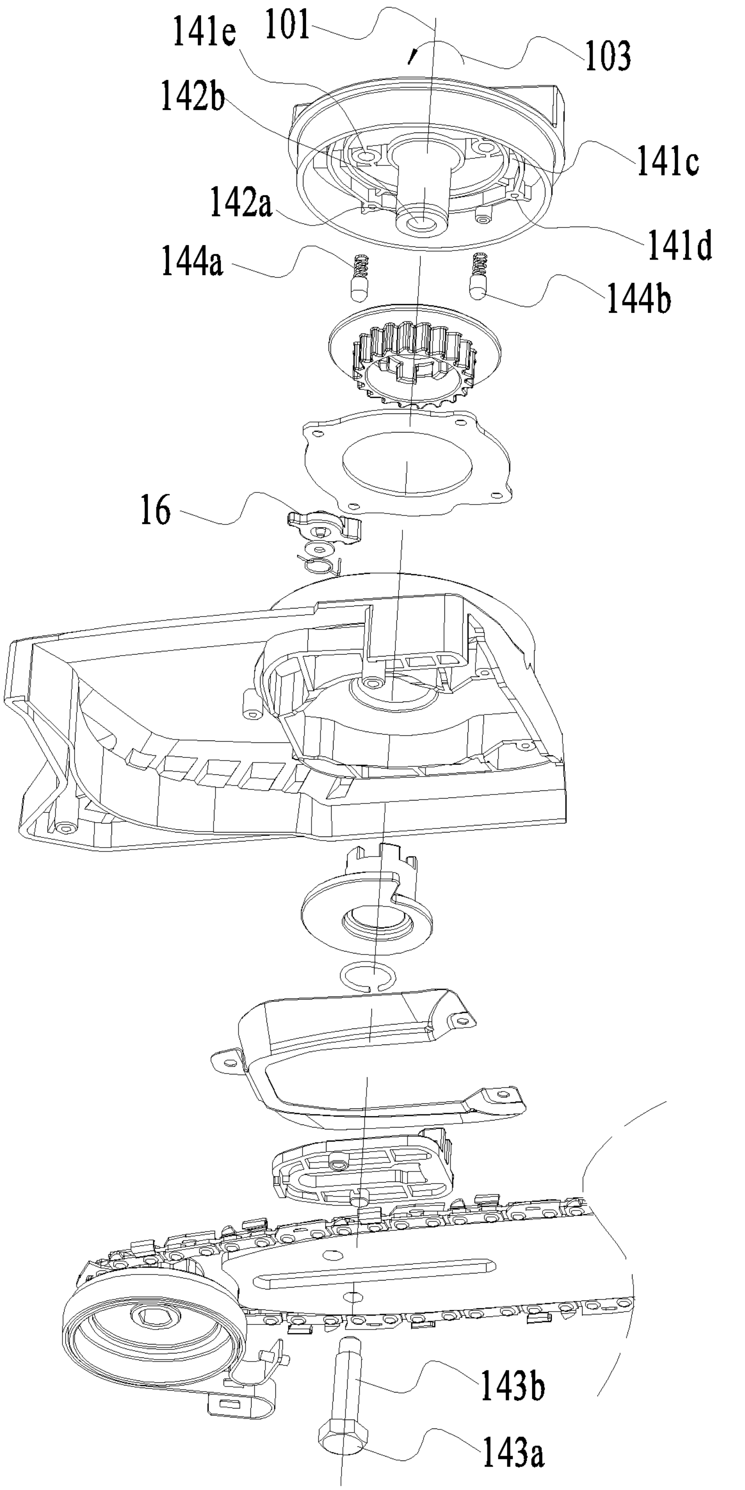
FIG. 4 is an exploded view of the locking device of the chain saw of FIG. 3 viewed from another perspective.
Figure 5:
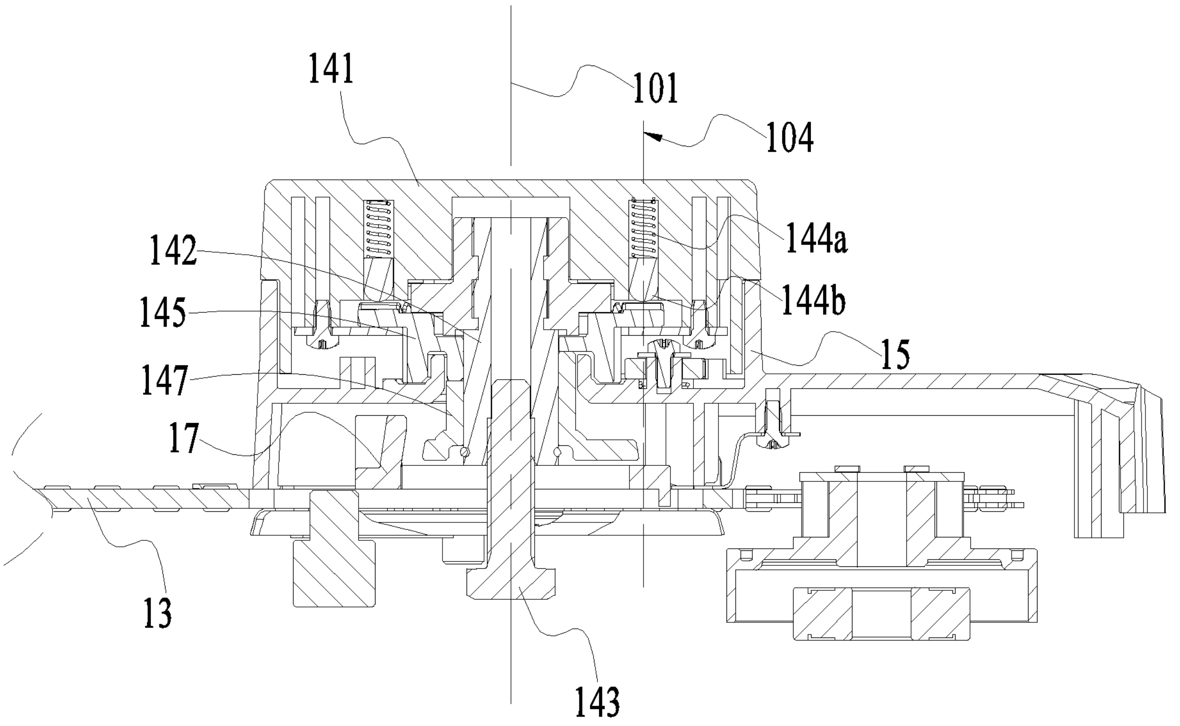
FIG. 5 is a cross-sectional view of the locking device of the chain saw of FIG. 1.
Figure 6:
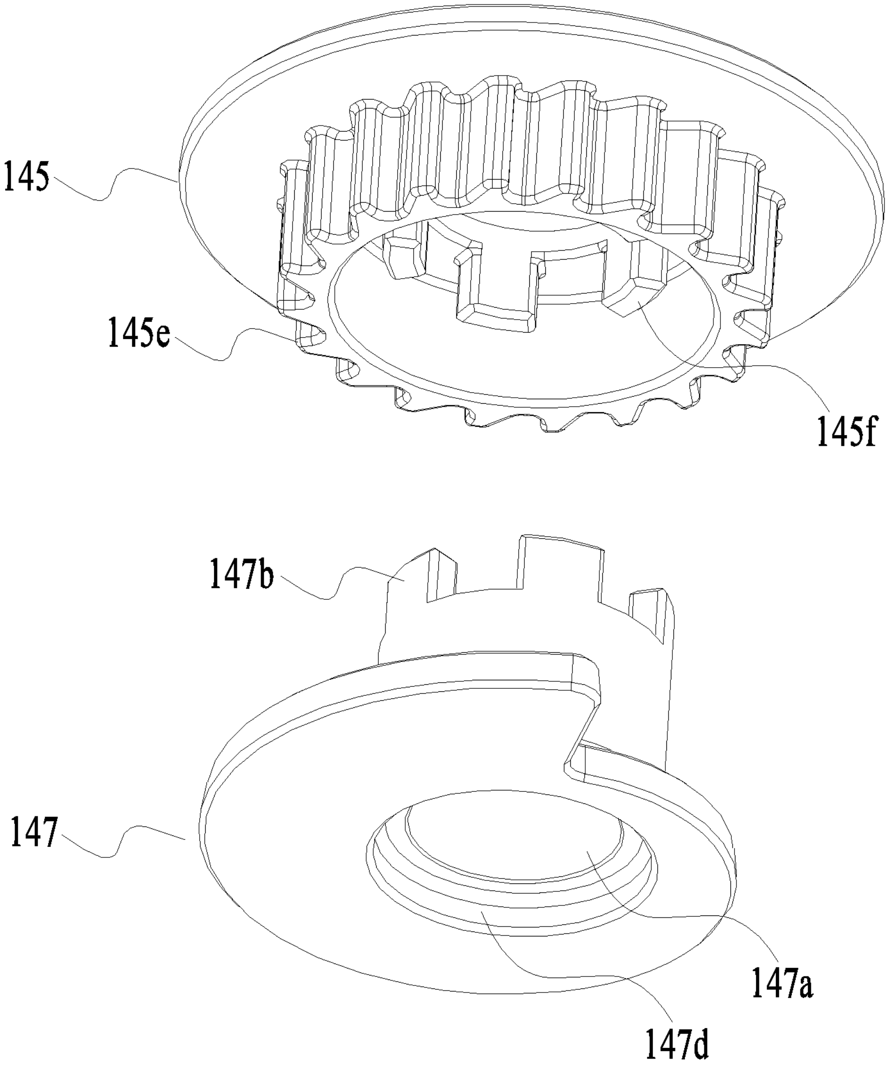
FIG. 6 is a schematic view illustrating a second clutch and a driving member of FIG. 4.
Figure 7:
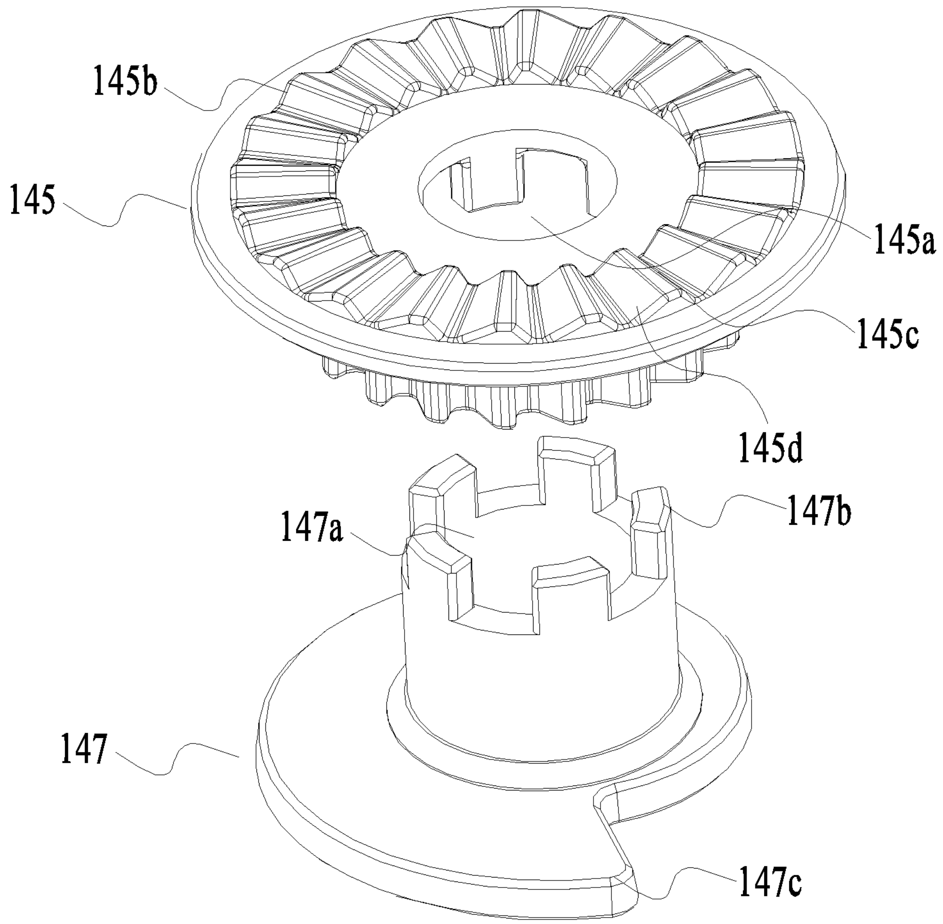
FIG. 7 is a schematic view of the second clutch and the driving member of FIG. 6 viewed from another perspective.
Figure 8:
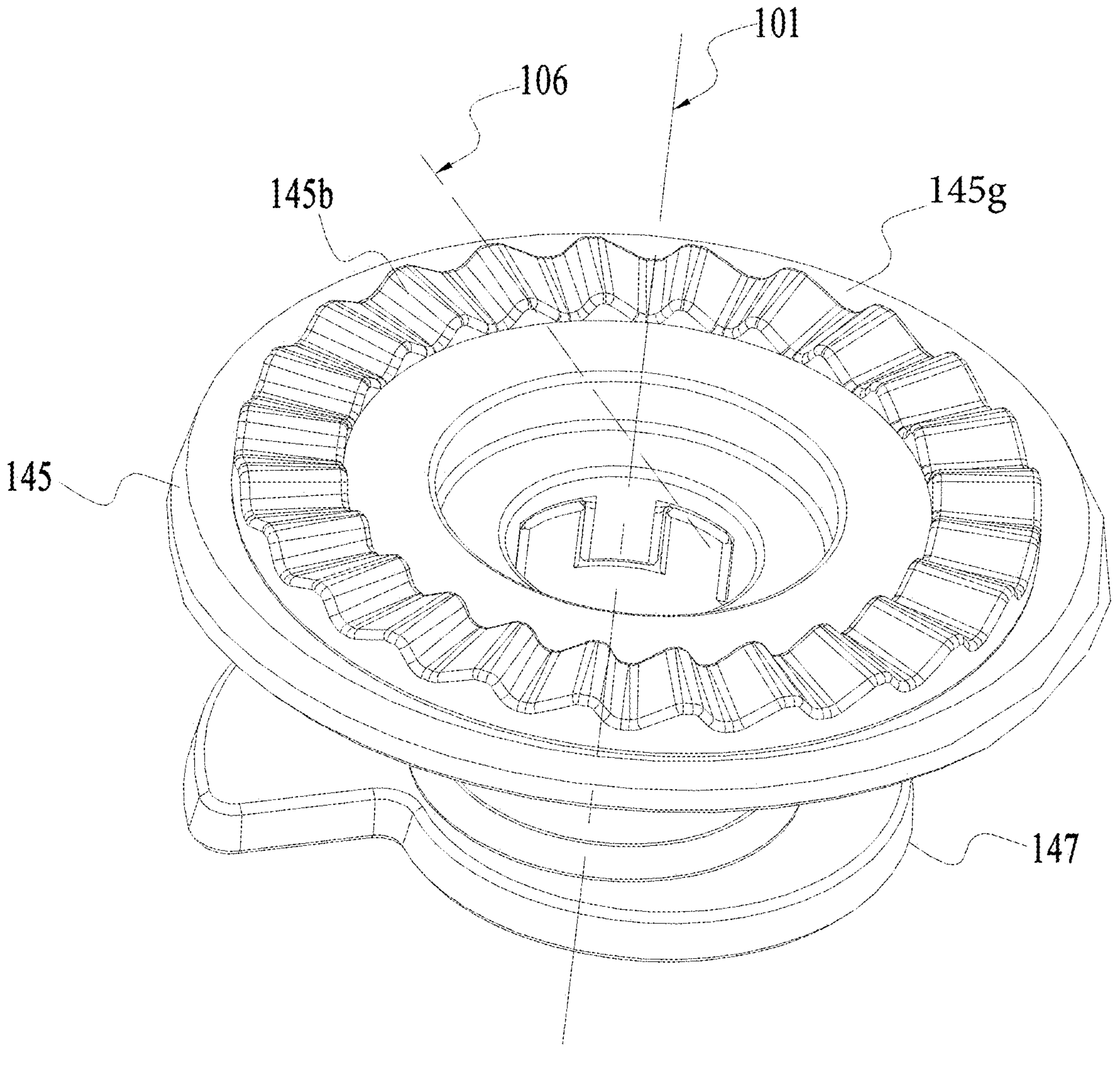
FIG. 8 is a schematic view of the second clutch and the driving member of FIG. 7 after they are combined.

The chain saw 100 of the first example shown in FIG. 1 includes a main body 10, a chain 12, a guide plate 13, and a locking device 14. As shown in FIG. 2, the main body 10 includes a power output unit 11 for outputting power to the drive chain 12. The guide plate 13 is used for supporting and guiding the chain 12 to rotate around the guide plate 13.

The locking device 14 is used for fixing the guide plate 13 and tensioning the chain 12. The locking device 14 is detachably connected to the main body 10. The guide plate 13 is disposed between the main body 10 and the locking device 14. The locking device 14 and the main body 10 clamp the guide plate 13. As shown in FIG. 1 and FIG. 2, the locking device 14 is installed to the joint of the guide plate 13 and the main body 10.

As shown in FIG. 2 to FIG. 8, the locking device 14 includes: an operating member 141, a first locking member 142, a second locking member 143, a first clutch assembly **14*a*, a first mounting member 146, a driving member 147, and a device housing 15**.

The operating member 141 is used to be operated by a user to rotate about a first axis 101 relative the main body 10. The first locking member 142 rotates synchronously with the operating member 141. The first locking member 142 is fixedly connected to the operating member 141, or the first locking member 142 is integrally formed with the operating member 141. The first locking member 142 is a cylindrical nut extending along the first axis 101, and the first locking member 142 is formed with an internal thread hole **142*b*. The first locking member 142 includes a first end and a second end, the first end is fixedly connected to the operating member 141, and the second end is formed with a limit slot 142*a***.

The second locking member 143 which is matched with the first locking member 142 to lock the guide plate 13. The second locking member 143 is a bolt with external threads. The second locking member 143 can insert to the internal thread hole **142*b* of the first locking member 142. The second locking member 143 includes a pressing portion 143*a* for pressing the guide plate 13 and a connecting portion 143*b* for connecting the first locking member 142 through the guide plate 13**.

The first clutch assembly **14*a* includes a first clutch 144 and a second clutch 145, and the first clutch 144 is detachably connected to the operating member 141. The first clutch 144 couples with the operating member 141 to rotate synchronously with the operating member 141. The second clutch 145 is sleeved onto the first locking member 142 and assembled to the operating member 141 through the first mounting member 146. The first clutch 144 produces relative displacement relative to the second clutch 145, the relative displacement enables the first clutch 144 to change position along a first line 104 with respect to the second clutch 145. The relative displacement of the first clutch 144 relative to the second clutch may be a translation of the first clutch 144 relative to the second clutch 145, or a rotation of the first clutch 144 relative to the second clutch 145, or a combined motion of translation and rotation of the first clutch 144 relative to the second clutch 145. That is to say, the relative displacement of the first clutch 144 relative to the second clutch 145 has a displacement component in the direction of the first axis 101. Or in other examples, the relative displacement of the first clutch 144 relative to the second clutch 145 has a displacement component in the direction perpendicular to the first axis 101. In fact, it is within the scope of the present disclosure to vary the position of the first clutch 144 relative to the second clutch 145 in space. In the present example, the first line 104 is parallel to the first axis 101**.

The driving member 147 is connected with the second clutch 145 so that the driving member 147 is capable of rotating synchronously with the second clutch 145 to drive the guide plate 13 to move to tension the chain 12. The driving member 147 is sleeved onto the first locking member 142 and is detachably connected to the second clutch 145. The driving member 147 can rotate synchronously with the second clutch 145 about the first axis 101.

The device housing 15 is used to connect with the main body 10. The operating member 141 is mounted on the device housing 15.

The chain saw 100 includes a push plate 17. The driving member 147 can drive the push plate 17 to move when rotating, and then the push plate 17 pushes the guide plate 13 to move away from the power output unit 11, thereby tensioning the chain 12.

The operating member 141 includes a first surface 141*a* and a second surface 141*c*, the first surface 141*a* is formed with an operating portion 141*b* for a user to operate, and the second surface 141*c* is formed with a first receiving space for receiving the second clutch 145. A screw hole 141*d* for fixing the first mounting member 146 is distributed in the first receiving space in a direction of centering around the first axis 101. Further, a first receiving cavity 141*e* for receiving the first clutch 144 is formed in the first receiving space.

The locking device 14 includes at least two of the first clutch 144. The first clutch 144 is a pin 144*b*. The locking device 14 further includes first elastic members 144*a*. The first elastic members 144*a* are springs. The pin 144*b* consists of a cylinder portion 144*c* and a spherical portion 144*d*. The spherical portion 144*d* is used to contact with the first sloped surface 145*c* and the second sloped surface 145*d*. The first elastic member 144*a* and the pin 144*b* constitute a fixed connection or a detachable connection and are installed in the first receiving cavity 141*e* of the operating member 141. The first elastic members 144*a* bias the at least two of the first clutch 144 so that the at least two of the first clutch 144 contacts with the second clutch 145.

Figure 9:
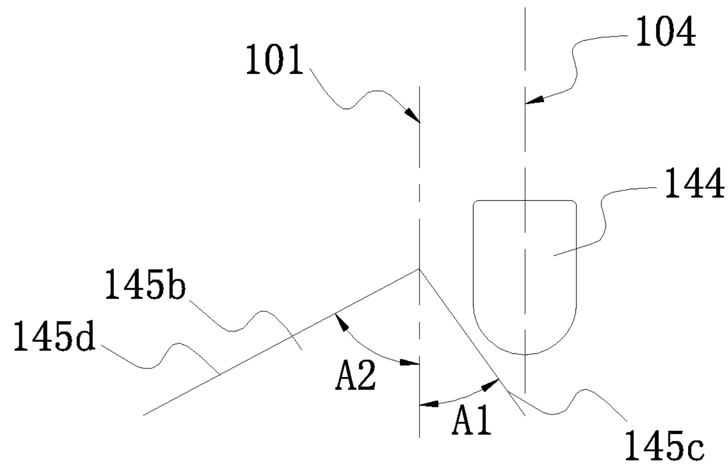
FIG. 9 is a view of one of the meshing teeth and the first clutch when the first clutch and the second clutch are in a first state.
Figure 10:
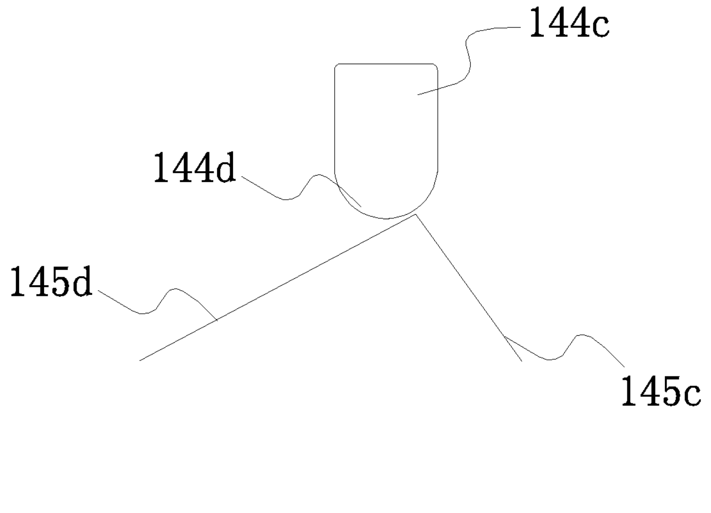
FIG. 10 is a view of the one of the meshing teeth and the first clutch when the first clutch and the second clutch are in a second state.
Figure 11:
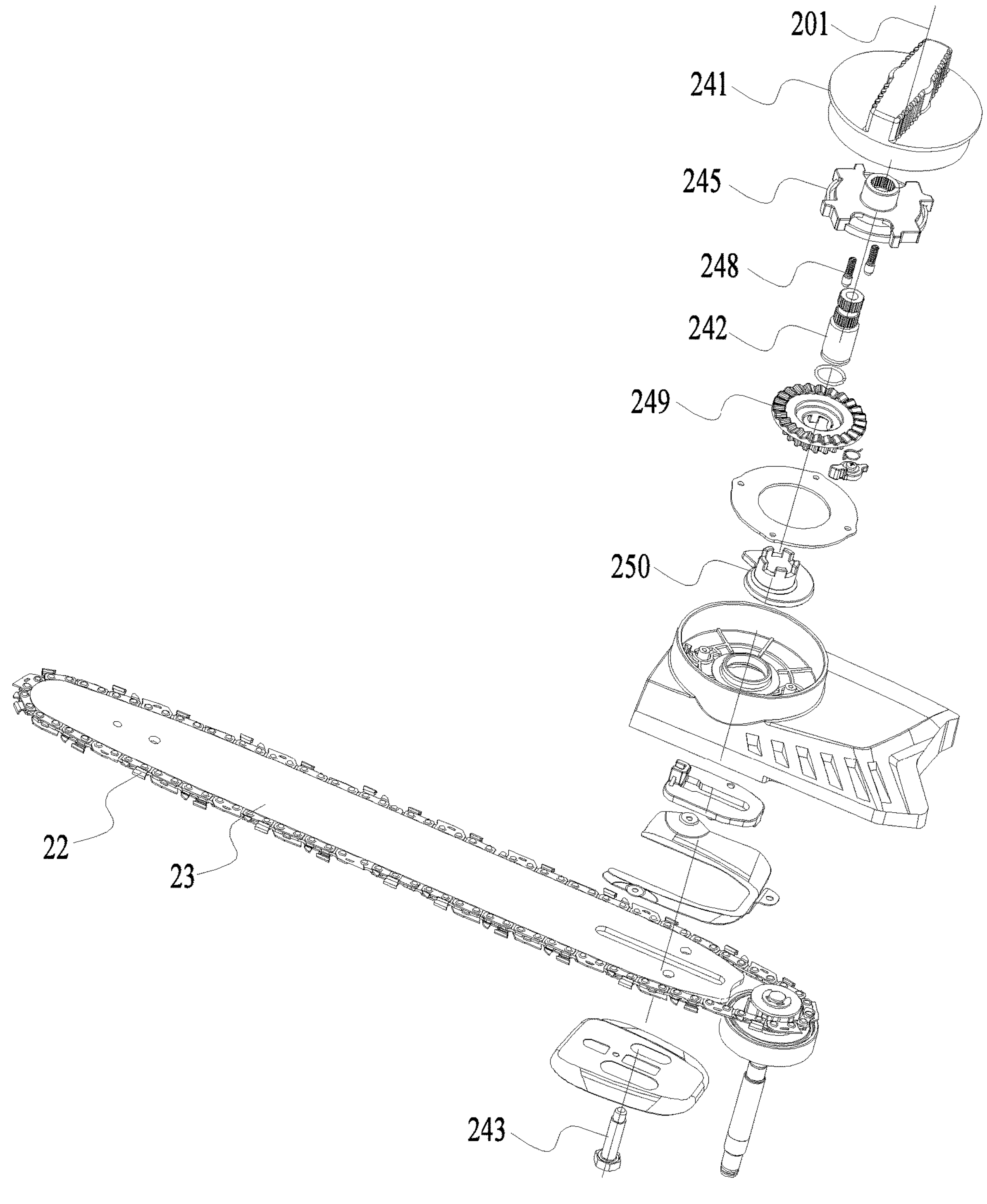
FIG. 11 is an exploded view illustrating a locking device of a chain saw of a second example in accordance with the present disclosure.
Figure 12:
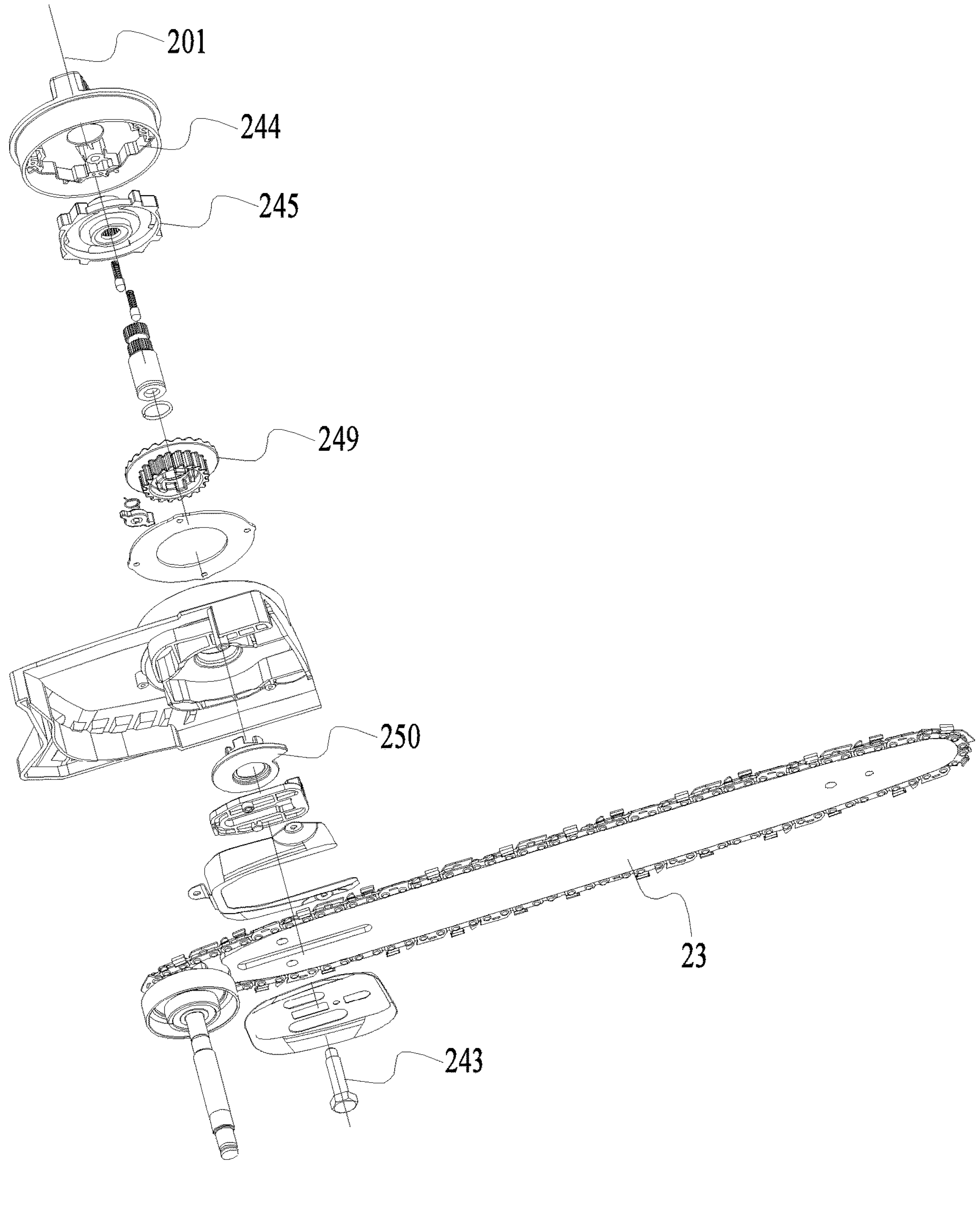
FIG. 12 is an exploded view of the locking device of the chain saw of FIG. 11 viewed from another perspective.

The second clutch 145 is formed with a first through hole 145*a* penetrating through itself in the direction of the first axis 101, and the first locking member 142 passes through the first through hole 145*a*. The second clutch 145 further includes a third surface 145*g* and a fourth surface. The third surface 145*g* is formed with meshing teeth 145*b* that cooperates with the first clutch 144, the third surface 145*g* is perpendicular to the first axis, the meshing teeth 145*b* are formed by protrusions surrounding the first through hole 145*a*, and the meshing teeth 145*b* extend along a radial direction 106 perpendicular to the first axis 101. Each of the meshing teeth 145*b* includes a first sloped surface 145*c* and a second sloped surface 145*d*. The first sloped surface 145*c* has a first slope, and the second sloped surface 145*d* has a second slope, and the absolute value of the first slope is greater than that of the second slope. It can be understood that when the user operates the operating member 141 to rotate in a first direction 102 around the first axis 101, the first clutch 144 contacts with and pushes first sloped surface 145*c* to drive the second clutch 145 to rotate, and the first clutch assembly is in a first state as shown in FIG. 9. At this time, because the absolute value of first slope of the first sloped surface 145*c* is large, the first clutch 144 cannot easily pass over the protrusions along the first sloped surface 145*c*. And when the user operates the operating member 141 to rotate in a second direction 103 around the first axis 101, the first clutch 144 pushes the second sloped surface 145*d*, and the clutch assembly is in a second state as shown in FIG. 10. At this time, because the absolute value of second slope of the second sloped surface 145*d* is small, the first clutch 144 passes easily over the protrusions along the second sloped surface 145*d*. The fourth surface extends around the first through hole 145*a* to form a ratchet 145*e*. The locking device 14 includes a limiting assembly 14*b*. The limiting assembly 14*b* prevents the second clutch 145 from rotating in the first direction 102 about the first axis 101 and allows the second clutch 145 to rotate in the second direction 103 about the first axis 101. When the operating member 141 rotates in the second direction, the second clutch 145 contacts with the second sloped surface 145*d* and crosses the second sloped surface 145*d*. The limiting assembly 14*b* includes a pawl 16, and the pawl 16 prevents reverse rotation of the second clutch 145 when the pawl 16 cooperates with the ratchet 145*e*. Further, first transmission teeth 145*f* surround the first through hole 145*a* of the second clutch 145 and the first transmission teeth 145*f* are used to drive the driving member to rotate with the second clutch 145. The first transmission teeth 145*f* are evenly arranged around the first through hole 145*a*, and the first transmission teeth 145*f* are circumferentially surrounded by the ratchet 145*e*. In this example, the first direction 102 is a direction in which the operating member 141 rotates clockwise relative to the main body 10, and the second direction 103 is a direction in which the operating member 141 rotates counterclockwise relative to the main body 10. Of course, those skilled in the art can also make out the opposite understanding of the first direction 102 and the second direction 103 described above.

As shown in FIG. 7 to FIG. 10, an angle A1 formed by the intersection of the first sloped surface 145*c* and the first axis 101 is smaller than an angle A2 formed by the intersection of the second sloped surface 145*d* and the first axis 101. When the operating member 141 rotates, the first clutch 144 moves relative to the operating member 141 in the first line 104 parallel to the first axis 101.

The driving member 147 is formed with a second through hole 147*a* around the first axis 101 for receiving the first locking member 142. The driving member 147 further includes a third end and a fourth end. The third end is formed with second transmission teeth 147*b* that fit the first transmission teeth 145*f* around the second through hole 147*a*. The second clutch 145 and the driving member 147 are connected by the first transmission teeth 145*f* and the second transmission teeth 147*b* to form a synchronous rotation.

Further, the fourth end of the driving member 147 is further formed with a spiral block 147*c* extending around the second through hole 147*a*. It can be understood that the radius of the spiral block 147*c* gradually increases around the second through hole 147*a* and finally reaches a preset value. As the radius gradually increases, the size of the spiral block 147*c* protruding from the second through hole 147*a* gradually increases. During the rotation of the driving member 147, the spiral block 147*c* pushes a convex portion 171 of the push plate 17 to gradually tension the chain 12. And the fourth end of the second through hole 147*a* is formed with a stop groove 147*d*. The locking device 14 includes a locking ring 148. The locking ring 148 is partially located in the stop groove 147*d* and partially embedded in the limit slot 142*a* of the first locking member 142, thereby limiting the ability of the driving member 147 to be disengaged from the second clutch 145.

The device housing 15 is formed with a fifth surface and a sixth surface. The fifth surface is formed with a third through hole 151 penetrating through itself in the direction of the first axis 101 and for the first locking member 142 and the driving member 147 to pass through. At the same time, a second receiving space is formed around the third through hole 151, and cooperates with the first receiving space of the operating member 141 to form a second receiving cavity. The first locking member 142, the first clutch 144, the second clutch 145 and the first mounting member 146 are at least partially located in the second receiving cavity, and the pawl 16 is connected to the second receiving space by screws. A second elastic member is disposed between the pawl 16 and the device housing 15, and the second elastic member generates an elastic force for driving the pawl 16 to always cooperate with the ratchet 145*e*. An engaging portion of the pawl 16 is unidirectionally engaged with a slot of the ratchet 145*e*, so that the ratchet 145*e* can only be rotated in one direction at a time. In this example, there is illustrated a single pawl 16. The sixth surface is formed with a receiving space that at least partially receives the power output unit 11, the guide plate 13, and the chain 12.

In this example, when the first clutch 144 is mounted to the first receiving cavity, and then the second clutch 145 is sleeved onto the first locking member 142 until the first clutch 144 contacts the meshing teeth 145*b* of the second clutch 145 to generate a preload. Here, the elastic force of the first clutch 144 has been adjusted to an optimal elastic force according to the preset tension of the tension chain 12. At this moment, the first mounting member 146 is sleeved onto the ratchet 145*e* of the second clutch 145 and connected to the operating member 141 by screws, thereby ensuring that the second clutch 145 does not disengage from the operating member 141 and the preload is produced between the first clutch 144 and the second clutch 145. At this moment, the ratchet 145*e* of the second clutch 145 is engaged with the pawl 16 so that only one-way rotation can be performed. In this example, the second clutch 145 is preset to be rotatable only in the first direction 102. Further, the operating member 141 is mounted to the fifth surface of the device housing 15 to form a second receiving cavity. The driving member 147 is inserted from the third through hole 151 of the sixth surface, and the first transmission teeth 145*f* and the second fitting teeth 147*b* are engaged with each other, so that the second clutch 145 and the driving member 147 form a synchronous rotation. At this moment, the first locking member 142 passes through the first through hole 145*a* of the second clutch 145 and the second through hole 147*a* of the driving member 147, and the locking ring 148 is locked into the limit slot 142*a* of the first locking member 142, thereby limiting the driving member 147 from the second clutch 145, the above-mentioned components form a complete locking device 14 by the above-mentioned connection. The push plate 17 is fixedly connected to the guide plate 13, and the second locking member 143 is inserted into the limit slot 142*a* where the guide plate 13 and the push plate 17 are overlapped. The second locking member 143 is fixed to the main body 10. Specifically, the second locking member 143 is a bolt with external threads.

When the locking device 14 is mounted onto the main body 10, an internal thread hole 142*b* of the first locking member 142 is engaged with the second locking member 143, so that the first locking member 142 and the second locking member 143 are at least partially located in the internal thread hole 142*b* of the first locking member 142. It can be understood that when the user twist the operating member 141 to rotate in the first direction 102, the first clutch 144 pushes the first sloped surface 145*c* and drives the second clutch 145 and the driving member 147 to rotate in the first direction 102, and the first clutch 144 and the second clutch 145 are in the first state. At this moment, the radius of the spiral block 147*c* is gradually increased, and the push plate 17 drives the guide plate 13 to gradually move away from the power output unit 11. Since the chain 12 is fixed to the power output unit 11 at one end and gradually separated from the power output unit 11 at the other end, it is gradually tensioned until the preset tension is reached. At this moment, the first elastic member 144*a* of the first clutch 144 reaches the maximum elastic force. In the above process, the first clutch 144 and the second clutch 145 are in the first state, and the first clutch 144 cannot pass over the first slope 145*c*. Continuing to rotate the operating member 141, the pin 144*b* of the first clutch 144 passes over the first slope 145*c*, the first clutch 144 and the meshing teeth 145*b* are in relative motion, and the first clutch 144 and the second clutch 145 are in the second state. The second clutch 145 does not rotate synchronously with the operating member 141 along the first direction 102. Further, since the guide plate 13 is clamped between the first locking member 142 and the second locking member 143, therefore, continuing to rotate the operating member 141 causes the second locking member 143 to gradually move upward when the first clutch 144 and the second clutch 145 are in the second state, and then the first locking member 142 is gradually tightened to the second locking member 143 and the guide plate 13 is gradually clamped to the main body 10. When the guide plate 13 needs to be disassembled, the user twists the operating member 141 in the second direction 103. Since the second clutch 145 can only rotate in the first direction 102, at this moment, the first clutch 144 cannot drive the second clutch 145 to rotate synchronously. The first clutch 144 and the second clutch 145 are in the second state, and the first clutch 144 pushes the second sloped surface 145*d*, since the absolute value of the second slope is small the user can twist the operating member 141 with a small torque. The first locking member 142 and the second locking member 143 are quickly loosened, so that the guide plate 13 can be detached from the main body 10 and thus disassembled.

As shown in FIG. 11 to FIG. 15, a chain saw 200 according to a second example may have the same structure of the main body, the power output unit, and the guide plate 23 as shown in the first example, but the structure of an operating member 241 and a first locking member 242 of the locking device 24 in this example are different. The portions of the first example that are compatible with the present example can be applied to the present example. Only the differences between the present example and the first example will be described below.

In this example, the operating member 241 and the first locking member 242 are no longer fixedly connected or integrally formed. The first locking member 242 is fixedly connected with a fourth clutch 245 and forms a fastening body. The operating member 241 is fixedly connected to the third clutch 244, and the fastening body cooperates with the third clutch 244 to realize the clutching of the operating member 241 and the first locking member 242. The third clutch 244 is a resilient elastic piece, detachably mounted in a preset limit slot in the operating member 241 and having a first stop surface 244*a*. The fourth clutch 245 is formed with meshing teeth around the first axis 201. The meshing teeth is formed with a second stop surface 245*a* and a third stop surface 245*b*, the second stop surface 245*a* has a third slope, the third stop surface 245*b* has a fourth slope, and the absolute value of the fourth slope is greater than that of the third slope. The fourth clutch 245 forms a stop slot along the direction of the first axis 201, the stop slot cooperates with the protruding screw hole of the operating member 241 such that the first position and the second position exist between the fourth clutch 245 and the operating member 241.

Figure 13:
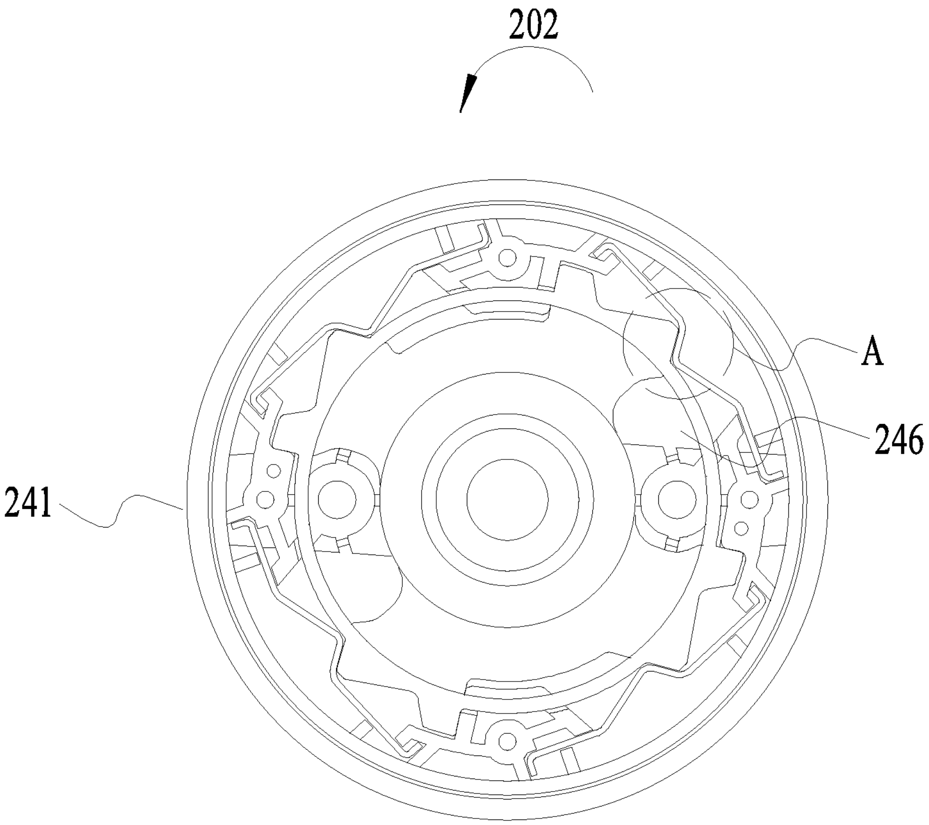
FIG. 13 is a schematic view of the third clutch and the fourth clutch where they are located in the operating member in a third state in the second example.
Figure 14:
FIG. 14 is a partial enlarged view of part A of FIG. 13.
Figure 15:
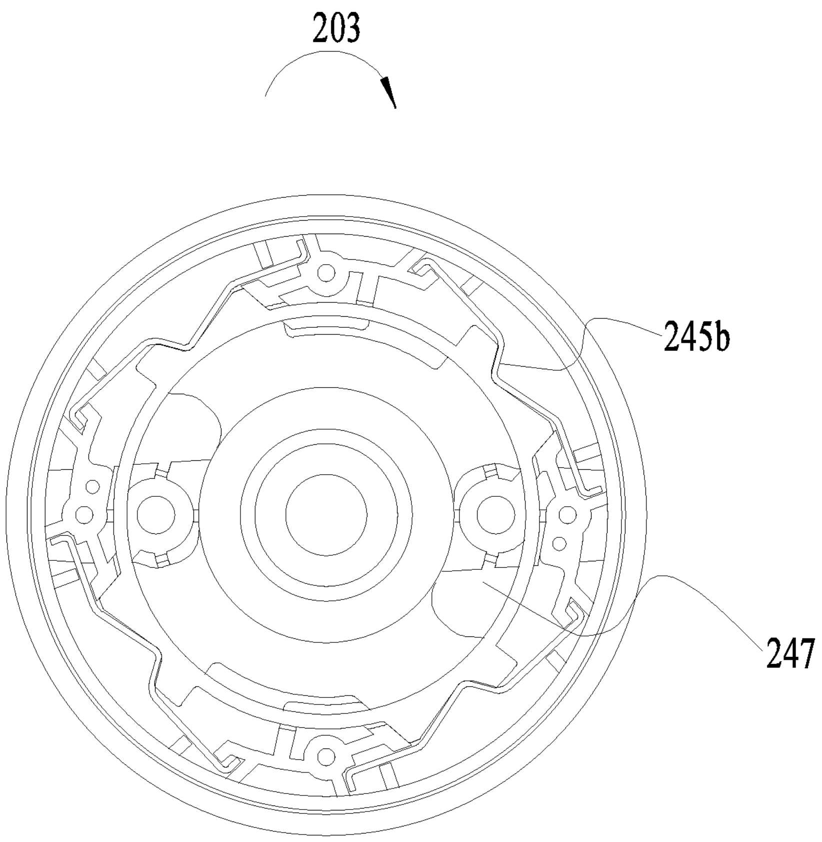
FIG. 15 is a schematic view of the third clutch and the fourth clutch where they are located in the operating member in a fourth state in the second example.

When the user twists the operating member 241 to rotate in a first direction 202, as shown in FIG. 13 and FIG. 14, the operating member 241 and the fourth clutch 245 are in the first position, the first stop surface 244*a* cooperates with the second stop surface 245*a*, the third clutch 244 is in a third state relative to the fourth clutch 245, the operating member 241 drives the fastening body to rotate synchronously, thereby driving the second clutch 249 and the driving member 250 to rotate, and the chain 22 is tensioned. When the chain 22 is tensioned to the preset tension, the operating member 241 is continuously twisted, a pin 248*a* of a first clutch 248 passes over the first sloped surface, the first clutch 248 and the third clutch 244 are in relative motion, and the third clutch 244 is in a fourth state relative to the fourth clutch 245. The second clutch 249 is no longer rotated synchronously with the operating member 241 in the first direction 202. Further, since a guide plate 23 is clamped between the first locking member 242 and a second locking member 243, therefore, during the above-mentioned operation, the first locking member 242 is gradually tightened to the second locking member 243, and the guide plate 23 is gradually clamped to the main body. When the guide plate 23 is clamped, the operating member 241 is continuously twisted, and the first stop surface 244*a* of the third clutch 244 will pass over the second stop surface 245*a* of the meshing teeth. Then the user can hear a "click" to be reminded that the guide plate 23 has been tightened. At this moment the third clutch 244 does not limit the rotation of the forth clutch 245, and the fourth clutch 245 is rotated to the second position. At this moment, the operating member 241 is continuously twisted, since the protruding screw hole of the operating member 241 is limited in the stop groove, the operating member 241 can drive the fastening body to continue to rotate, thereby continuing to tighten the guide plate 23.

When the third clutch 244 and the fourth clutch 245 are kept in the first position, the first stop surface 244*a* cooperates with the second stop surface 245*a*, the third clutch 244 is in a third state capable of limiting the rotation of the fourth clutch 245, at this moment, the operating member 241 is twisted to rotate in the second direction 203, and then the operating member 241 drives the fastening body to rotate in the second direction 203 to loosen the guide plate 23. When the third clutch 244 and the fourth clutch 245 are kept in the second position, the third clutch 244 does not limit the rotation of the forth clutch 245, at this moment, the operating member 241 is twisted to rotate in the second direction 203, and then the operating member 241 drives the fastening body to rotate in the second direction 203 to loosen the guide plate 23 by cooperation between the stop groove and the protruding screw hole.

It can be understood that the convex portion of the operating member 241 can be adjusted outside the range where the fourth clutch 245 rotates. At this moment, the operating member 241 and the fourth clutch 245 have no relative position. When the user operates the operating member 241 to rotate in the first direction 202, the clutch torque reaches the maximum value, and the stop surface of the third clutch 244 passes over the second stop surface 245*a* of the fourth clutch 245, the third clutch 244 is in the fourth state relative to the fourth clutch 245, and can continue to rotate to the next stop surface of the fourth clutch 245 to realize the clutching again, so that the guide plate 23 can be tightened through continuous clutching; conversely, when the user operates the operating member 241 to rotate in the second direction 203, since the second stop surface 245*a* is formed with a third slope, the third stop surface 245*b* is formed with a fourth slope, and the absolute value of the fourth slope is greater than that of the third one, therefore, the maximum clutch torque generated in the second direction is greater than that of the first direction, the third clutch 244 is in the third state relative to the fourth clutch 245, and the third clutch 244 transmits the rotation to the fourth clutch 245 and the guide plate 23 is loosened.

I claim:

1. A chain saw, comprising:

a main body;

a chain;

a guide plate supported by and extending from the main body, the guide plate supporting the chain with the chain rotating about the guide plate;

a power output unit mounted within the main body and coupled to the chain, the power unit rotatable for driving the chain about the guide plate to cut a workpiece; and a locking device coupled to the guide plate and configured to tension the chain, wherein the locking device comprises:

an operating member configured to be operated by a user to rotate about a first axis;

a driving member configured to drive the guide plate to move relative to the power output unit to tension the chain around the guide plate;

a first clutch coupled with the operating member and configured to rotate synchronously with the operating member;

a second clutch comprising meshing teeth operably contacting a surface of the first clutch; and a limiting assembly coupled to a surface of the second clutch and configured to prevent the second clutch from rotating in a first direction about the first axis and allow the second clutch to rotate in a second direction about the first axis, wherein the driving member is connected with the second clutch so that the driving member is capable of rotating synchronously with the second clutch to drive the guide plate to move, each of the meshing teeth comprises a first sloped surface having a first slope and a second sloped surface having a second slope, an absolute value of the first slope is greater than an absolute value of the second slope, the first clutch contacts the first sloped surface to drive the second clutch to rotate when the operating member rotates in the first direction, and the first clutch contacts the second sloped surface and crosses the second sloped surface when the operating member rotates in the second direction.

2. The chain saw according to claim 1, wherein an angle formed by an intersection of the first sloped surface and the first axis is smaller than an angle formed by an intersection of the second sloped surface and the first axis.

3. The chain saw according to claim 1, wherein the first clutch moves relative to the operating member in a first line parallel to the first axis when the operating member rotates.

4. The chain saw according to claim 3, wherein the locking device further comprises a first elastic member for biasing the first clutch so that the first clutch contacts the second clutch.

5. The chain saw according to claim 4, wherein the first clutch is a pin comprising a cylinder portion and a spherical portion, and the spherical portion is configured to contact the first sloped surface and the second sloped surface.

6. The chain saw according to claim 1, wherein the meshing teeth extend along a radial direction perpendicular to the first axis.

7. The chain saw according to claim 1, wherein the meshing teeth are arranged on a surface of the second clutch that is perpendicular to the first axis.

8. The chain saw according to claim 1, wherein the locking device comprises at least two of the first clutch.

9. The chain saw according to claim 8, wherein the locking device further comprises first elastic members for biasing the at least two of the first clutch so that the at least two of the first clutch contact the second clutch.

10. The chain saw according to claim 1, wherein the limiting assembly comprises a pawl, the second clutch is formed with a ratchet, and the pawl is engaged with the ratchet so that the second clutch is operative to rotate in only one direction.

11. The chain saw according to claim 1, wherein the locking device further comprises a first locking member configured to rotate synchronously with the operating member and a second locking member which is a fastener mateable matched with the first locking member to lock the guide plate to the main body.

12. The chain saw according to claim 1, wherein the second locking member comprises a pressing portion for pressing the guide plate and a connecting portion for connecting the first locking member through the guide plate.

13. A chain saw, comprising:

a main body a chain;

a guide plate supported by and extending from the main body, the guide plate for supporting the chain with the chain rotating about the guide plate;

a power output unit mounted within the main body and coupled to the chain, the power unit rotatable for driving the chain about the guide plate to cut a workpiece; and a locking device coupled to the guide plate and configured to tension the chain, wherein the locking device comprises:

an operating member configured to be operated by a user to rotate about a first axis;

a driving member configured to drive the guide plate to move relative to the power output unit to tension the chain around the guide plate;

a first clutch coupling with the operating member and configured to rotate synchronously with the operating member;

a second clutch comprising meshing teeth operably contacting a surface of the first clutch; and a limiting assembly coupled to a surface of the second clutch and configured to prevent the second clutch from rotating in a first direction about the first axis and allow the second clutch to rotate in a second direction about the first axis, wherein the driving member is connected with the second clutch so that the driving member is capable of rotating synchronously with the second clutch to drive the guide plate to move, each of the meshing teeth comprises a first sloped surface and a second sloped surface, an angle formed by an intersection of the first sloped surface and the first axis is smaller than an angle formed by an intersection of the second sloped surface and the first axis, the first clutch contacts the first sloped surface to drive the second clutch to rotate when the operating member rotates in the first direction, and the first clutch contacts the second sloped surface and crosses the second sloped surface when the operating member rotates in the second direction.

14. The chain saw according to claim 13, wherein the first clutch moves relative to the operating member in a first line parallel to the first axis when the operating member rotates.

15. The chain saw according to claim 14, wherein the first clutch is a pin comprising a cylinder portion and a spherical portion, and the spherical portion is configured to contact the first sloped surface and the second sloped surface.

16. The chain saw according to claim 13, wherein the meshing teeth extend along a radial direction perpendicular to the first axis.

17. The chain saw according to claim 13, wherein the meshing teeth are arranged on a surface of the second clutch that is perpendicular to the first axis.

18. The chain saw according to claim 17, wherein the locking device comprises at least two of the first clutch, the locking device further comprises first elastic members for biasing the at least two of the first clutch so that the at least two of the first clutch contact the second clutch.

19. The chain saw according to claim 13, wherein the limiting assembly comprises a pawl, the second clutch is formed with a ratchet, and the pawl is engaged with the ratchet so that the second clutch is operative to rotate in only one direction.

20. The chain saw according to claim 13, wherein the locking device further comprises a first locking member configured to rotate synchronously with the operating member and a second locking member which is a fastener mateable with the first locking member to lock the guide plate to the main body, and the second locking member comprises a pressing portion for pressing the guide plate and a connecting portion for connecting the first locking member through the guide plate.

* * * * *